(12) United States Patent
Wu (10) Patent No.: US 7,290,805 B2
(45) Date of Patent: Nov. 6, 2007

(54) PIPE CLIP

(75) Inventor: Ming-Tien Wu, Tainan (TW)

(73) Assignee: Highlight Tech. Corp., Tainan (TW)

( * ) Notice: Subject to any disclaimer, the term of this patent is extended or adjusted under 35 U.S.C. 154(b) by 0 days.

(21) Appl. No.: 11/305,116

(22) Filed: Dec. 19, 2005

(65) Prior Publication Data

US 2007/0138351 A1    Jun. 21, 2007

(51) Int. Cl.
    *F16L 17/00* (2006.01)
(52) U.S. Cl. ............... 285/365; 365/364; 365/366; 365/367
(58) Field of Classification Search ........... 248/74.2, 248/49, 65, 70, 73, 74.1, 229.15, 229.14, 248/229.24, 229.25, 230.5, 230.6; 285/365, 285/364, 366, 367, 371, 409, 322, 420, 421; 224/427, 448, 461, 558; 24/270, 271, 273
    See application file for complete search history.

(56) References Cited

U.S. PATENT DOCUMENTS

| 3,705,737 | A | * | 12/1972 | Westerlund et al. ........ 285/365 |
| 4,123,095 | A | * | 10/1978 | Stehlin ................. 285/409 |
| 4,445,657 | A | * | 5/1984 | Breckenridge ............ 248/73 |
| 4,492,005 | A | * | 1/1985 | Begley et al. ............ 24/270 |
| 4,573,717 | A | * | 3/1986 | Peacock ................. 285/365 |
| 4,730,850 | A | * | 3/1988 | Takahashi ................ 285/3 |
| 5,522,625 | A | * | 6/1996 | Flick et al. ............. 285/409 |
| 5,653,481 | A | * | 8/1997 | Alderman ............... 285/363 |
| 5,936,197 | A | * | 8/1999 | Katoh et al. ........... 174/40 CC |
| 6,056,332 | A | * | 5/2000 | Foster ................... 285/367 |
| 6,581,492 | B1 | * | 6/2003 | Chen ................... 74/551.3 |
| 6,755,445 | B2 | * | 6/2004 | Balamuta et al. ......... 285/357 |
| 2005/0275254 | A1 | * | 12/2005 | Anderson et al. ....... 297/195.1 |

* cited by examiner

*Primary Examiner*—Carl D. Friedman
*Assistant Examiner*—Todd M. Epps
(74) *Attorney, Agent, or Firm*—Leong C. Lei (57) ABSTRACT

A pipe clip includes upper and lower clip members that are pivoted at one end and form upper and lower slots with a locking bar fixed in the lower slot. The upper and lower clip members form upper and lower grooves for receiving and thus engaging flanges of pipe sections to be jointed therein. A U-shaped pull tab has two limbs fit over and pivoted to the upper slot. An abutting block is fixed while rotating between the limbs and defines a through hole through which a stem of a hook-on member extends by sliding. The hook-on member has a hooked end engaged with the locking bar. A helical spring is fit over the stem and retained between the abutting block and a nut engaging a threaded end of the stem. The clip is efficiently installed by engaging the hooked end of the hook-on member with the locking bar and can be secured and released by pushing/pulling the pull tab. The pull tab is configured to causes deformation of the spring to induce a torque against release of the pull tab from the secured position.

1 Claim, 12 Drawing Sheets

PIPE CLIP

BACKGROUND OF THE INVENTION (a) Technical Field of the Invention

The present invention generally relates to a pipe clip for joining two separate pipes having opposing end flanges, and in particular to a pipe clip comprised of a rotating upper and lower clip members that are release-secured together by a spring-biased hook-on member for efficient installation and compensation for fatigue of parts.

(b) Description of the Prior Art

Figure 1:
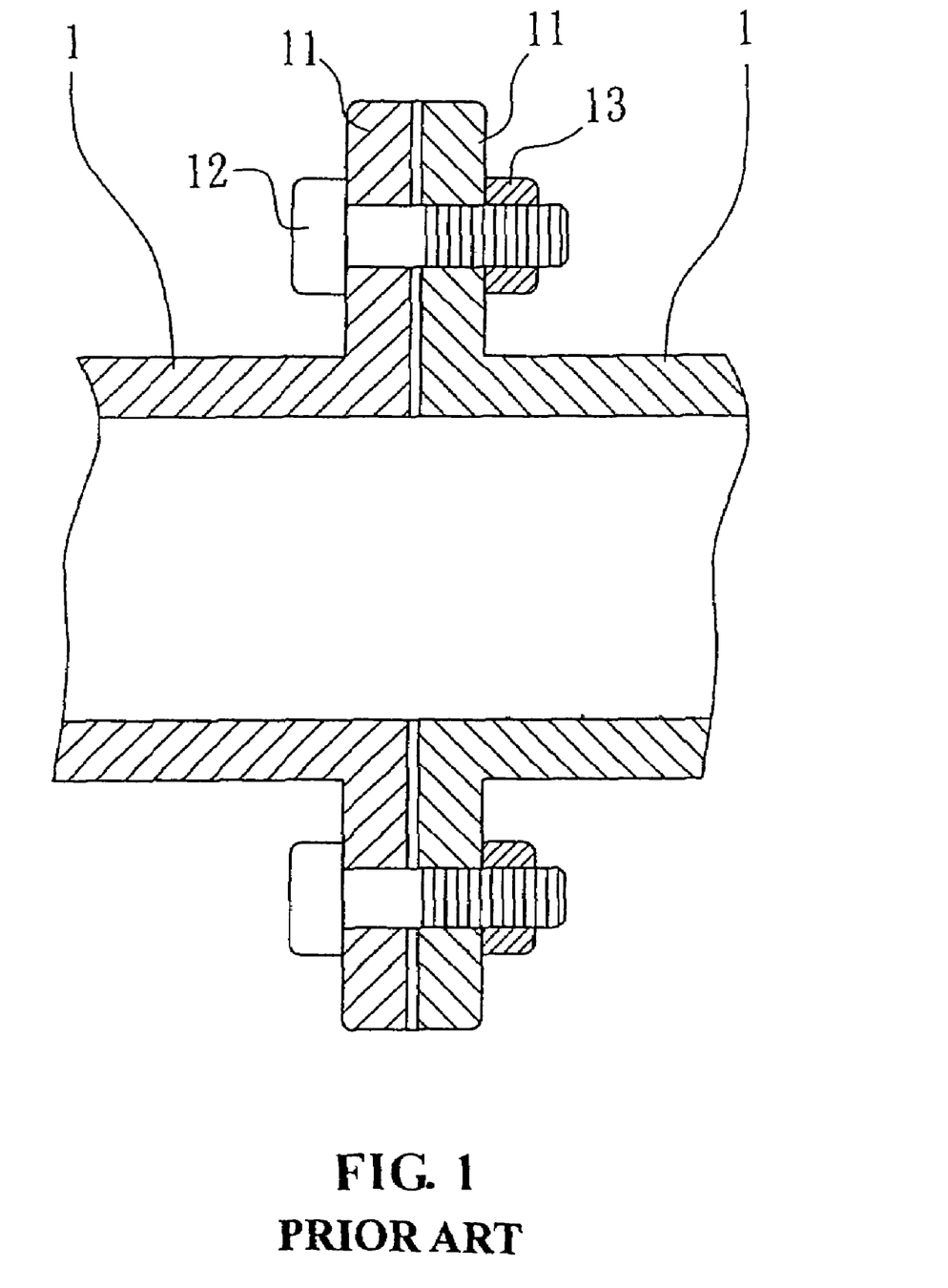
FIG. 1 is a cross-sectional view showing a conventional manner of jointing two pipe sections by bolts.
Figure 2:
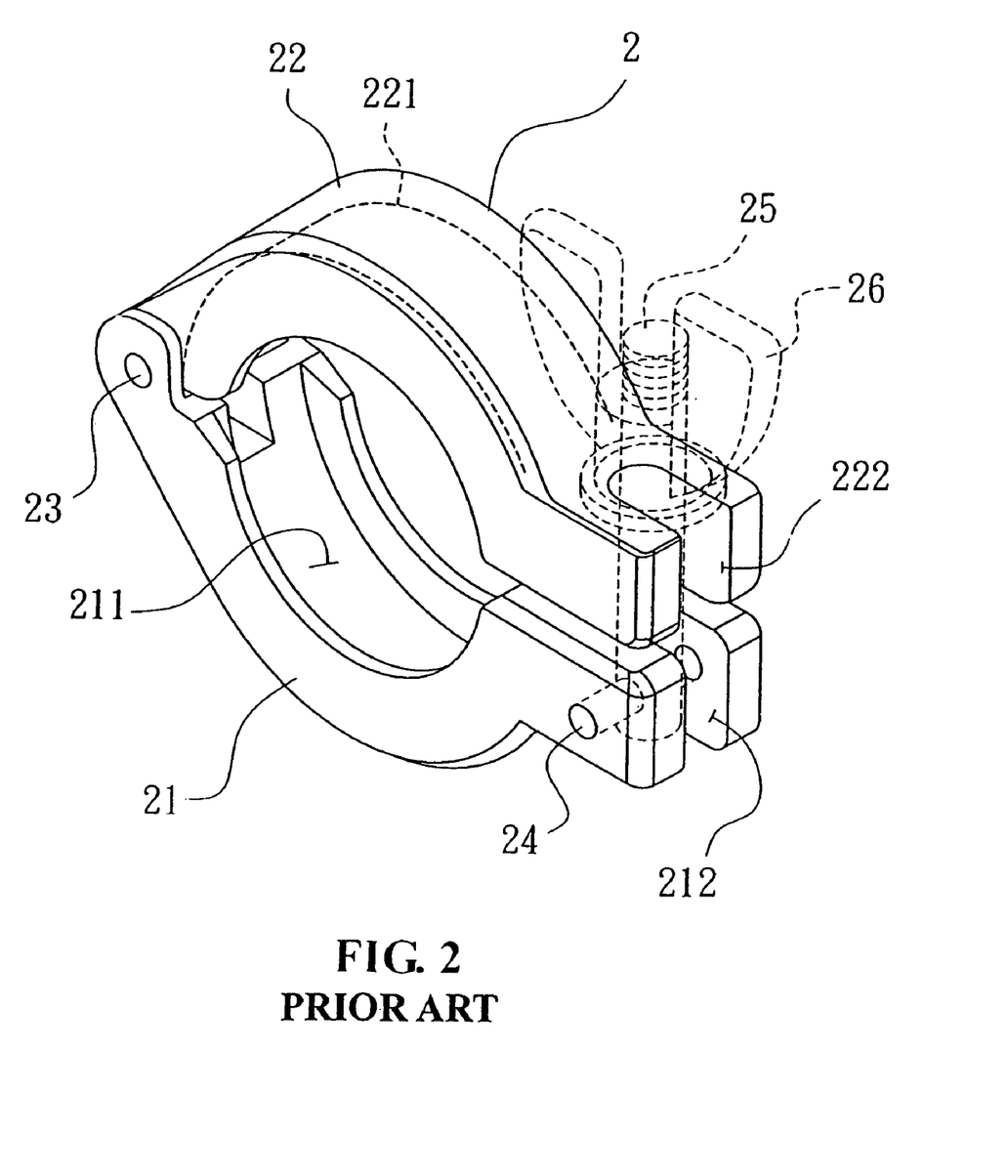
FIG. 2 is a perspective view showing a conventional pipe clip.
Figure 3:
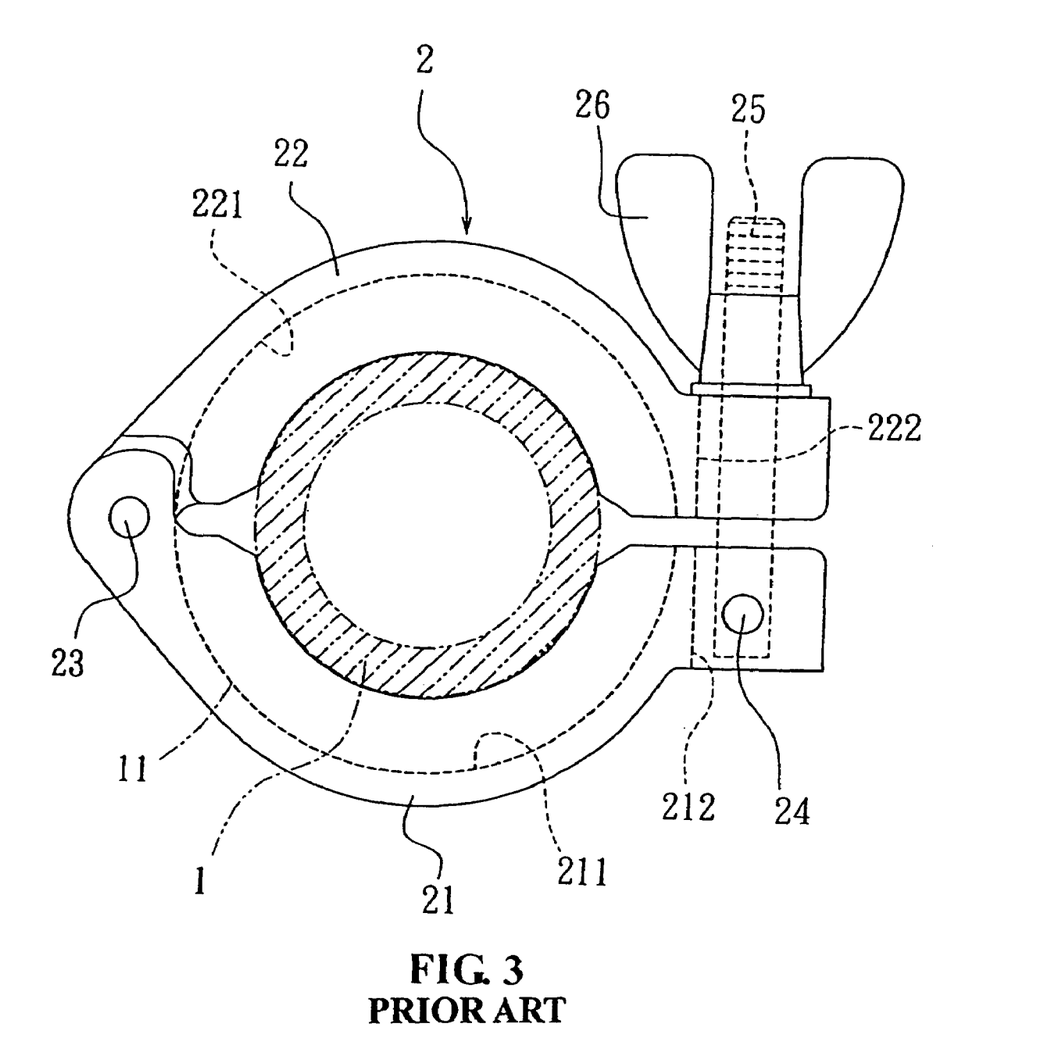
FIG. 3 is an end view of the conventional pipe clip in a closed and secured condition with pipe sections received therein.
Figure 4:
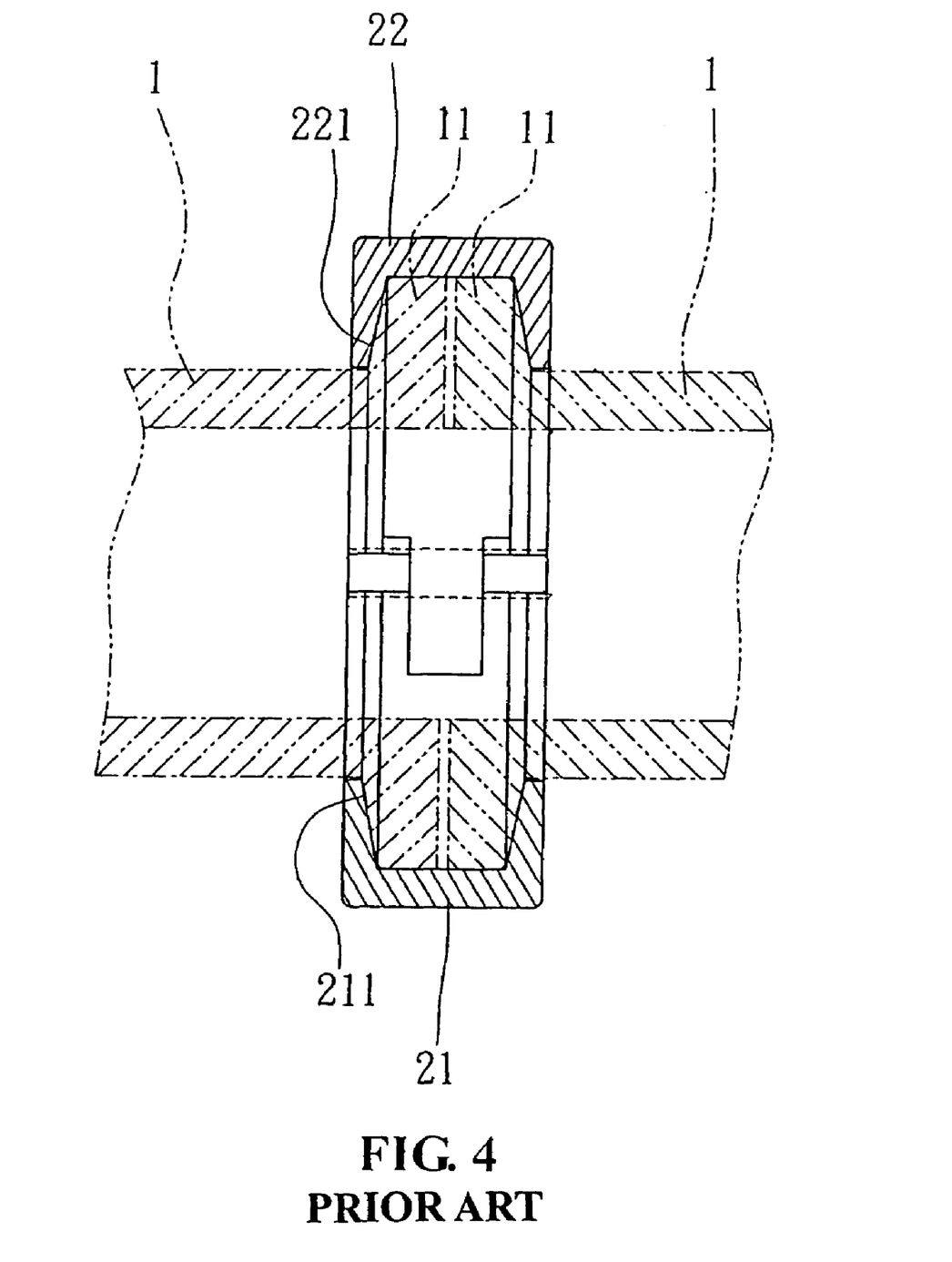
FIG. 4 is a cross-sectional view of the conventional pipe clip in the closed and secured condition with pipe sections received therein.

FIG. 1 of the attached drawings shows a conventional way for joining two sections of pipe with bolts. Each pipe section, which is designated with reference numeral 1 in the drawings, is formed with a flange 11 around an end thereof. Aligned holes are defined in the flanges 11 to receive bolts 12 that engage nuts 13 to apply a force that fixes the flanges 11 together. This construction has been widely used to join two pipe sections. However, it is very time consuming if the number of bolt-nut pairs used to joint the pipe section is great.

Figure 5:
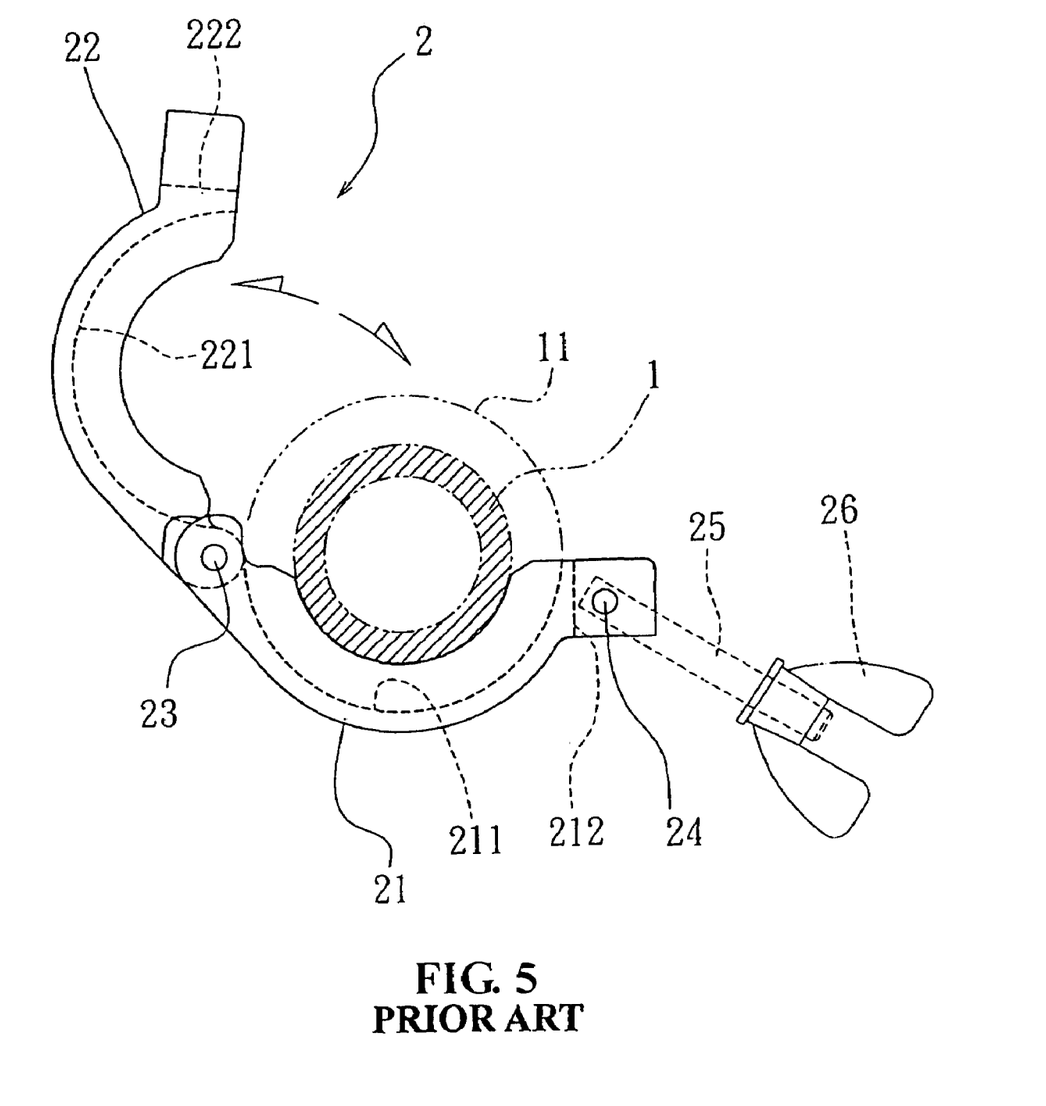
FIG. 5 is an end view of the conventional pipe clip showing opening/closing operation of the clip.
Figure 6:
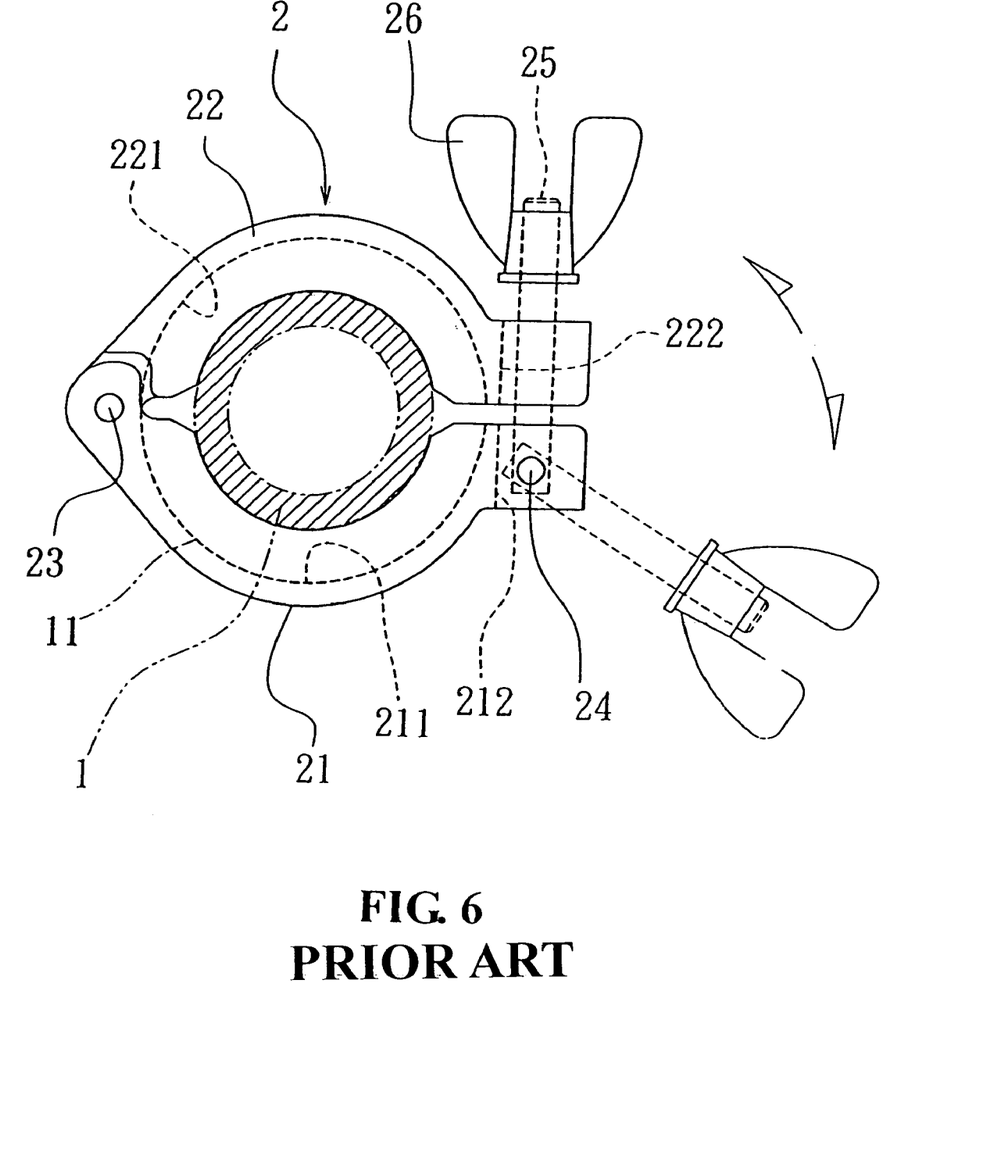
FIG. 6 is an end view of the conventional pipe clip in a closed condition showing securing/releasing operation of the pipe clip.
Figure 7:
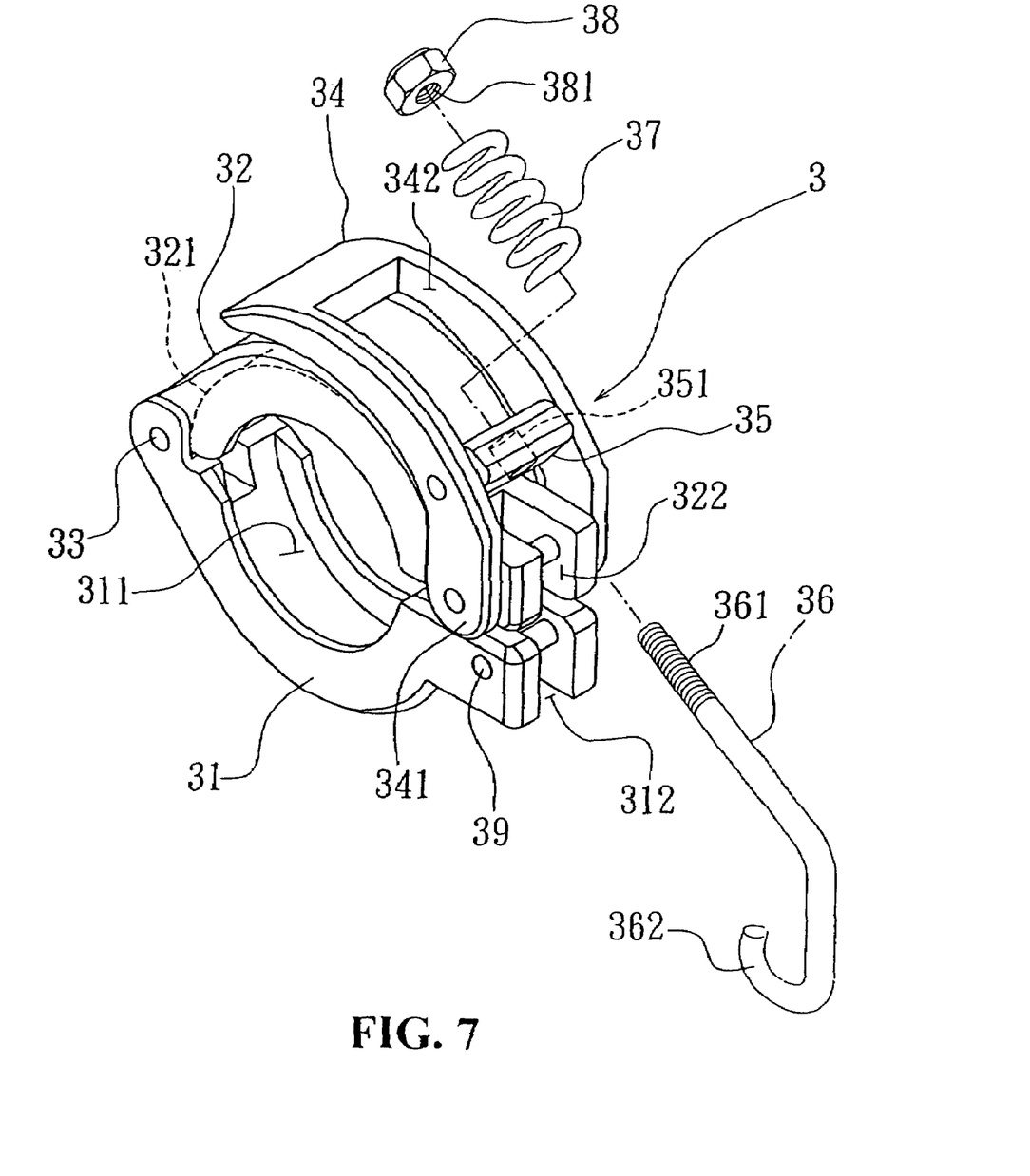
FIG. 7 is a perspective view, partially exploded, showing a pipe clip constructed in accordance with the present invention.
Figure 8:
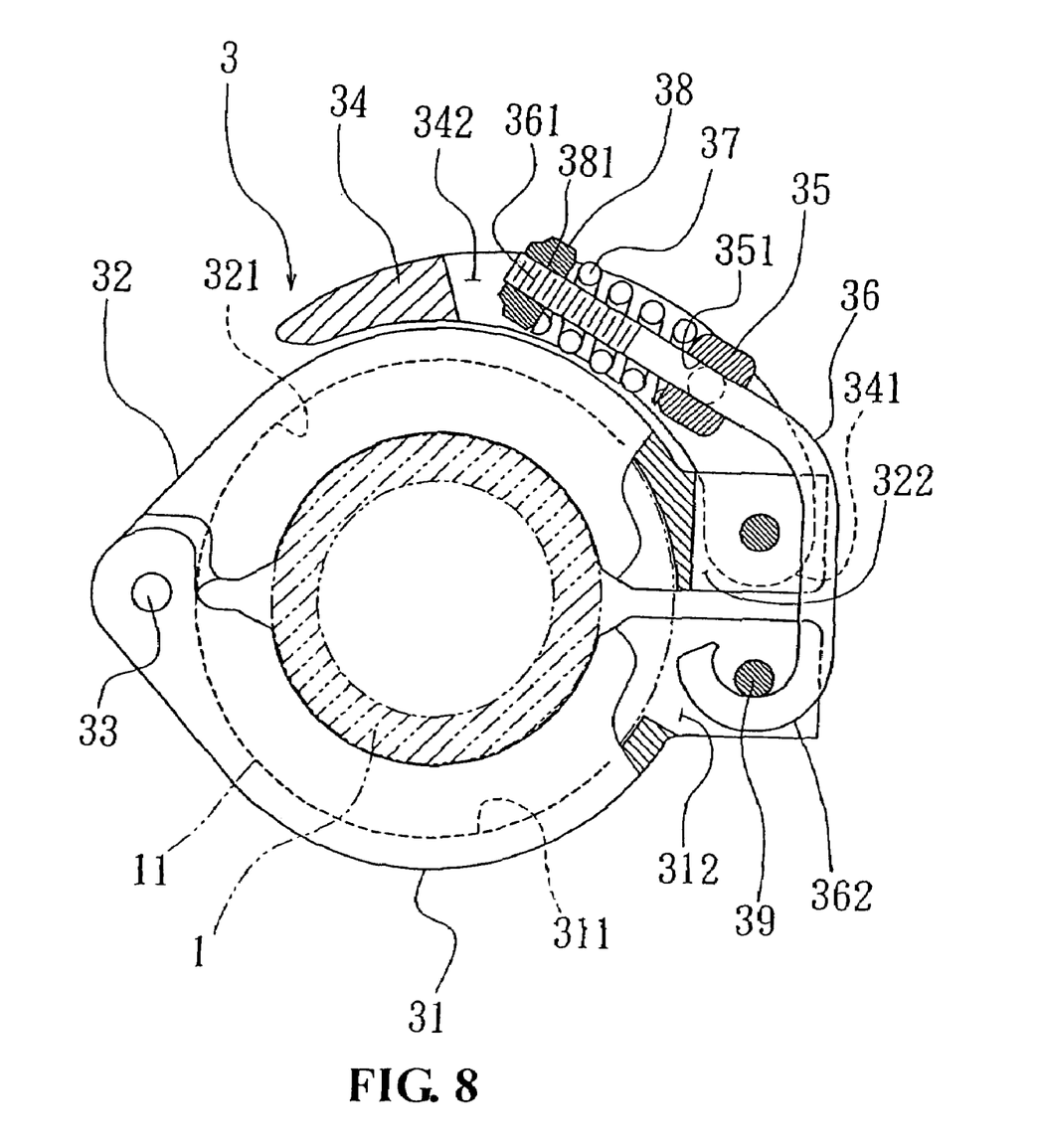
FIG. 8 is an end view of the pipe clip in a closed and secured condition with pipe sections received therein.

FIGS. 2-6 of the attached drawings show a conventional pipe clip that is used to join two flanged pipe sections, the pipe clip, which is generally designated with reference numeral 2, comprises upper and lower clipping members 21, 22 that form upper and lower flange receiving grooves 211, 221, respectively, joined at one end by a pivot 23 to allow for opening/closing operation of the clip 2 (see FIGS. 5 and 6, respectively). The upper and lower clipping members 21, 22 form, at an opposite end, aligned slots 212, 222 in which a bolt 25 is received. An end of the bolt 25 rotates while fixed in the lower slot 212 by a pivot pin 24 whereby the bolt 25 rotates while removed out of the upper slot 222 to allow opening of the upper clipping member 22 with respect to the lower clipping member 21. The bolt 25 has a threaded section engaged with a wing nut 26 to apply a force securing the clipping members 21, 22 together so as to securely joint two pipe sections 1 each having an end flange 11 (see FIGS. 3-6) received in the flange receiving grooves 211, 221 of the clipping members 21, 22.

The conventional pipe clip is disadvantageous in that substantial human labor is needed in tightening the wing nuts. This renders mounting/dismounting the pipe clip difficult and is a time-consuming process. In addition, repeated tightening/loosening causes fatigue of the thread of the bolt or nut and once the threaded is broken, the pipe clip is useless and has to be replaced.

Thus, the present invention is aimed to provide a pipe clip that eliminates the drawbacks of the conventional devices.

SUMMARY OF THE INVENTION

The primary purpose of the present invention is to eliminate the drawbacks of the conventional device, including tightening a number of bolts that extend through aligned holes defined in opposing end flanges of pipe sections to be jointed or tightening a bolt-wing nut pair that secures two clipping members that rotate with respect to each other, both being very time-consuming and labor-intensive, the present invention is aimed to provide a pipe clip comprising upper and lower clip members that are pivoted at one end and form upper and lower slots with a locking bar fixed in the lower slot. The upper and lower clip members form upper and lower grooves for receiving and thus engaging flanges of pipe sections to be joined therein. A U-shaped pull tab has two limbs fit over and pivoted to the upper slot. An abutting block rotates and is fixed between the limbs and defines a through hole through which a stem of a hook-on member slides while extending. The hook-on member has a hooked end which engages with the locking bar. A helical spring is fit over the stem and retained between the abutting block and a nut engaging a threaded end of the stem. The clip is efficiently installed by engaging the hooked end of the hook-on member with the locking bar and can be secured and released by pushing/pulling the pull tab. The pull tab is configured to causes deformation of the spring to induce a torque against release of the pull tab from the secured position.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

With reference to the drawings and in particular to FIGS. 7-10, a pipe clip constructed in accordance with the present invention, generally designated with reference numeral 3, comprises a lower clip member 31, an upper clip member 32, a pull tab 34, an abutting block 35, a resilient element 37, a retention member 38, and a releasable hook-on member 36. The upper and lower clip members 31, 32 form, in an inside face thereof, flange-receiving grooves 311, 321 for receiving and engaging end flanges 11 of pipe sections 1 (see FIGS. 8-10).

Figure 10:
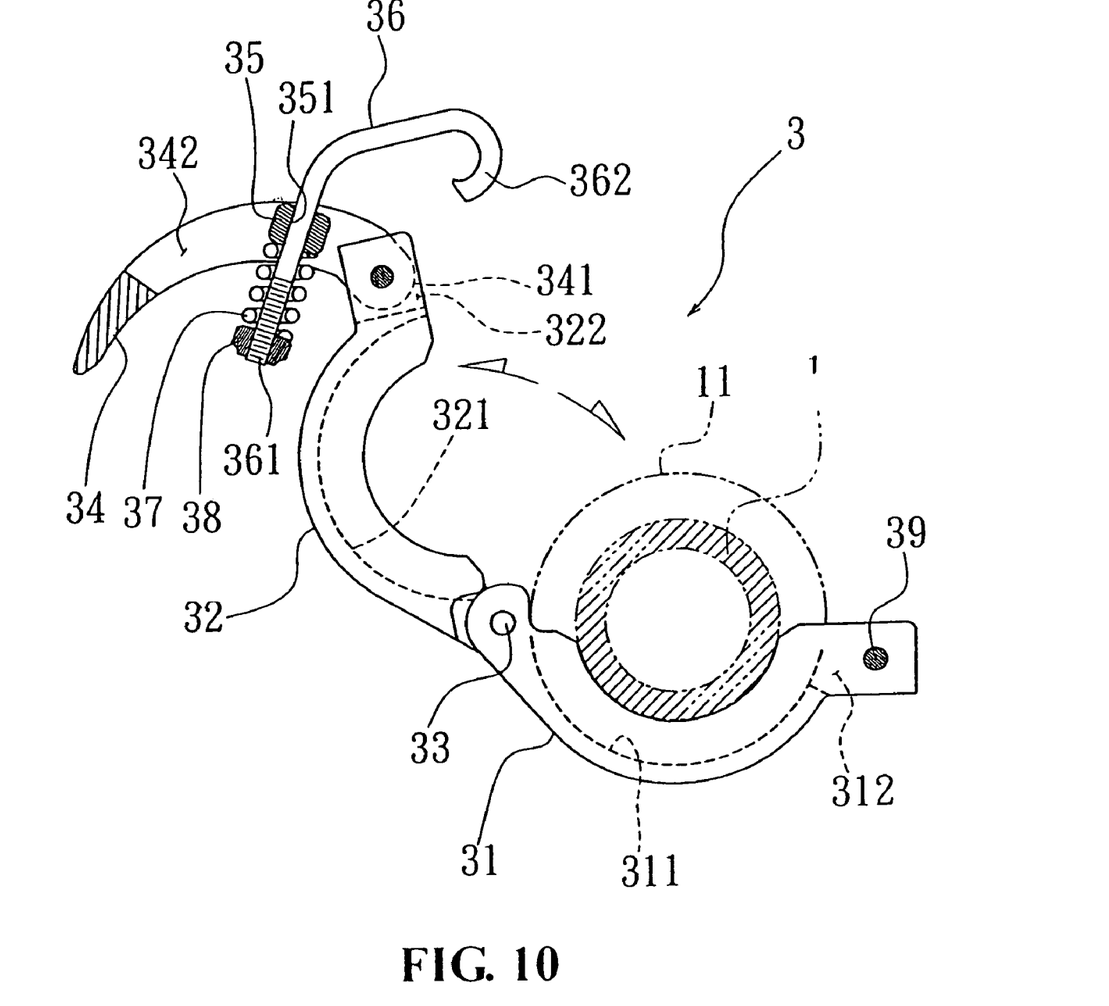
FIG. 10 is an end view of the pipe clip showing opening/closing operation of the clip.

The upper and lower clip members 31, 32 are pivoted to each other at one end by a pivot pin 33, whereby the upper clip member 31 is allowed to rotate about the pivot pin 33 with respect to the lower clip member 32 for opening and closing the pipe clip 3, as illustrated in FIG. 10. The upper and lower clip members 31, 32 form, at opposite end thereof, lower and upper slots 312, 322, respectively. A bar 39, serving as a pawl for releasing while engaging a hooked end 362 of the hook-on member 36, is fixed in the lower slot 312. For example, the bar 39 extends through aligned holes (not labeled) defined in opposite side walls of the lower slot 312.

The pull tab 34 is generally U-shaped, having two limbs delimiting a receiving space 342, the limbs being connected at bottom and having two free end sections 341 defining therebetween an opening fit over side walls of the upper slot 322 of the upper clip with free end sections 341 located outboard next to and pivoted to the side walls of the upper slot 322. Thus, the pull tab 34 rotates with respect to the upper clip member 32 between released position (see FIG. 11) and secured position (see FIG. 12). The abutting block 35 is arranged while rotating between the limbs of the pull tab 34 and forms a through hole 351 through which a stem portion (not labeled) of the hook-on member 36 whereby the hook-on member 36 rotates in unison with the abutting block 35 and is movable in an axial direction of the stem portion thereof with respect to the abutting block 35.

A threaded distal end 361 of the hook-on member 36, which is opposite to the hooked end 362, extends beyond the abutting block 35 and engages an inner-threading hole 381 of the retention member 38, which in the embodiment illustrated, is a nut. The resilient element 37 is retained between and abuts against the retention member 38 and the abutting block 35 to induce a biasing force to the hook-on member 36. Due to the threading engagement between the retention member 38 and the hook-on member 36, the retention member 38 is movable with respect to the hook-on member 36 to adjust the biasing force.

In the embodiment illustrated, the resilient element 37 comprises a helical spring encompassing the stem portion of the hook-on member 36.

Figure 9:
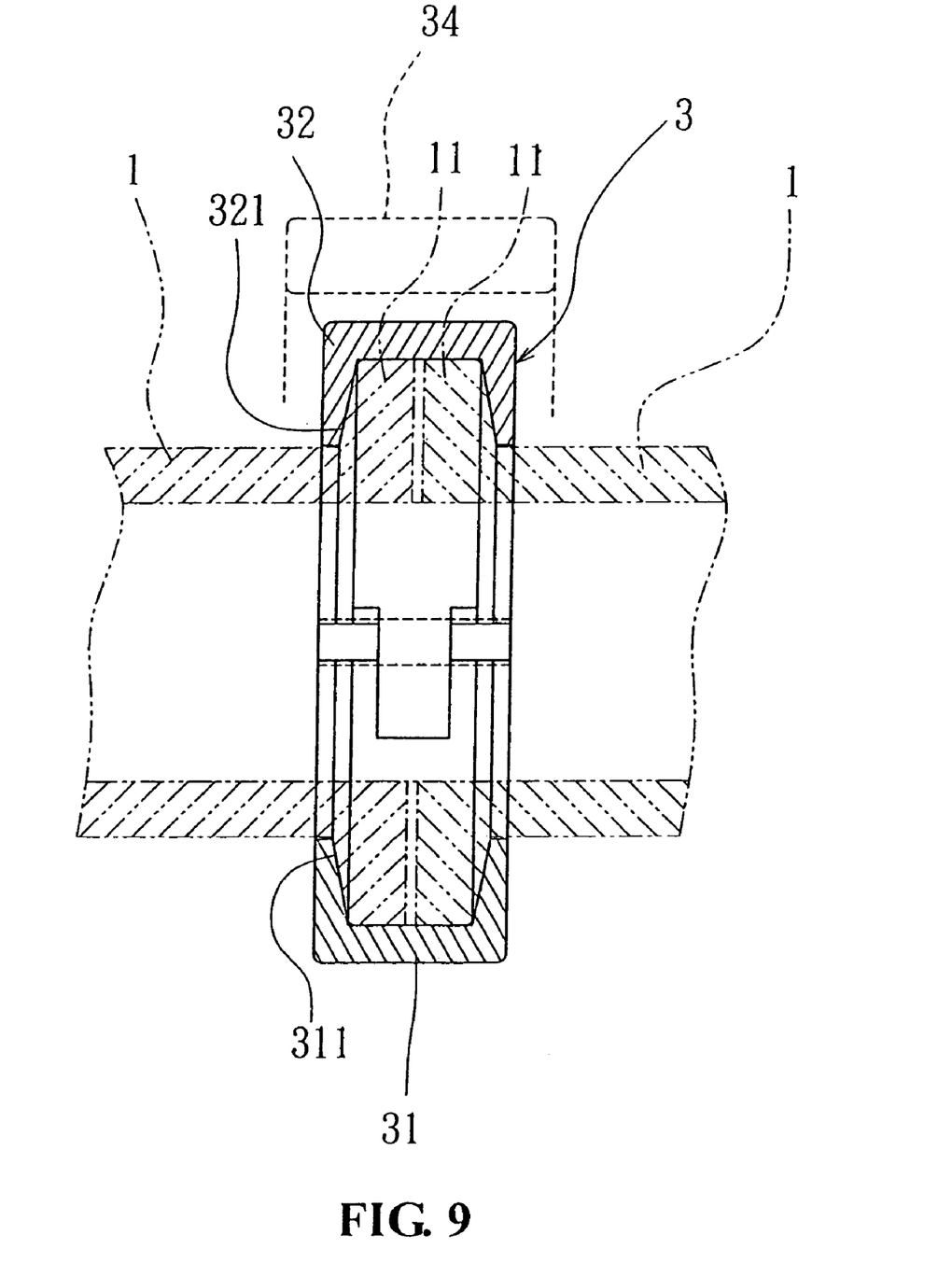
FIG. 9 is a cross-sectional view of the pipe clip in the closed and secured condition with pipe sections received therein.
Figure 11:
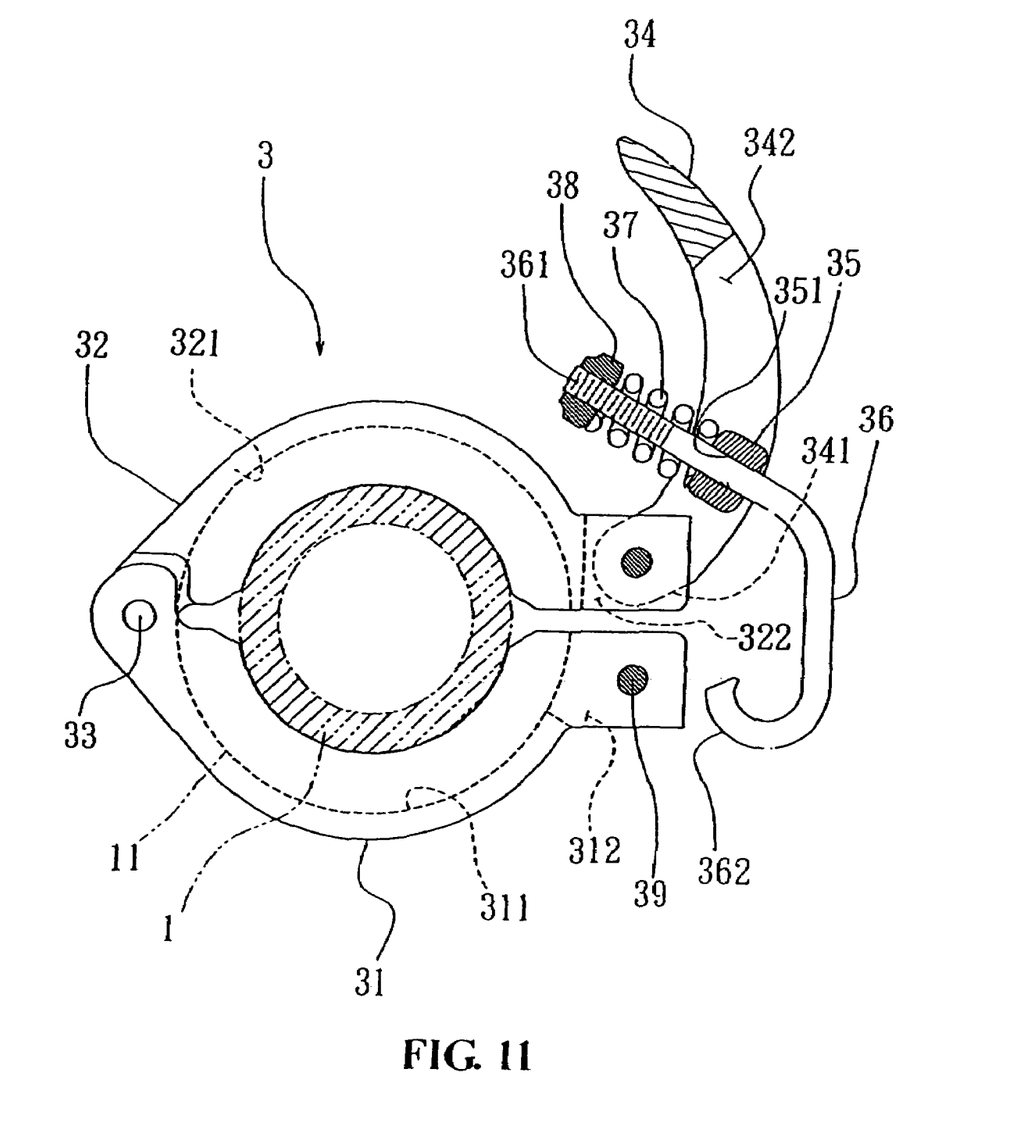
FIG. 11 is an end view of the pipe clip in a closed condition but not secured.
Figure 12:
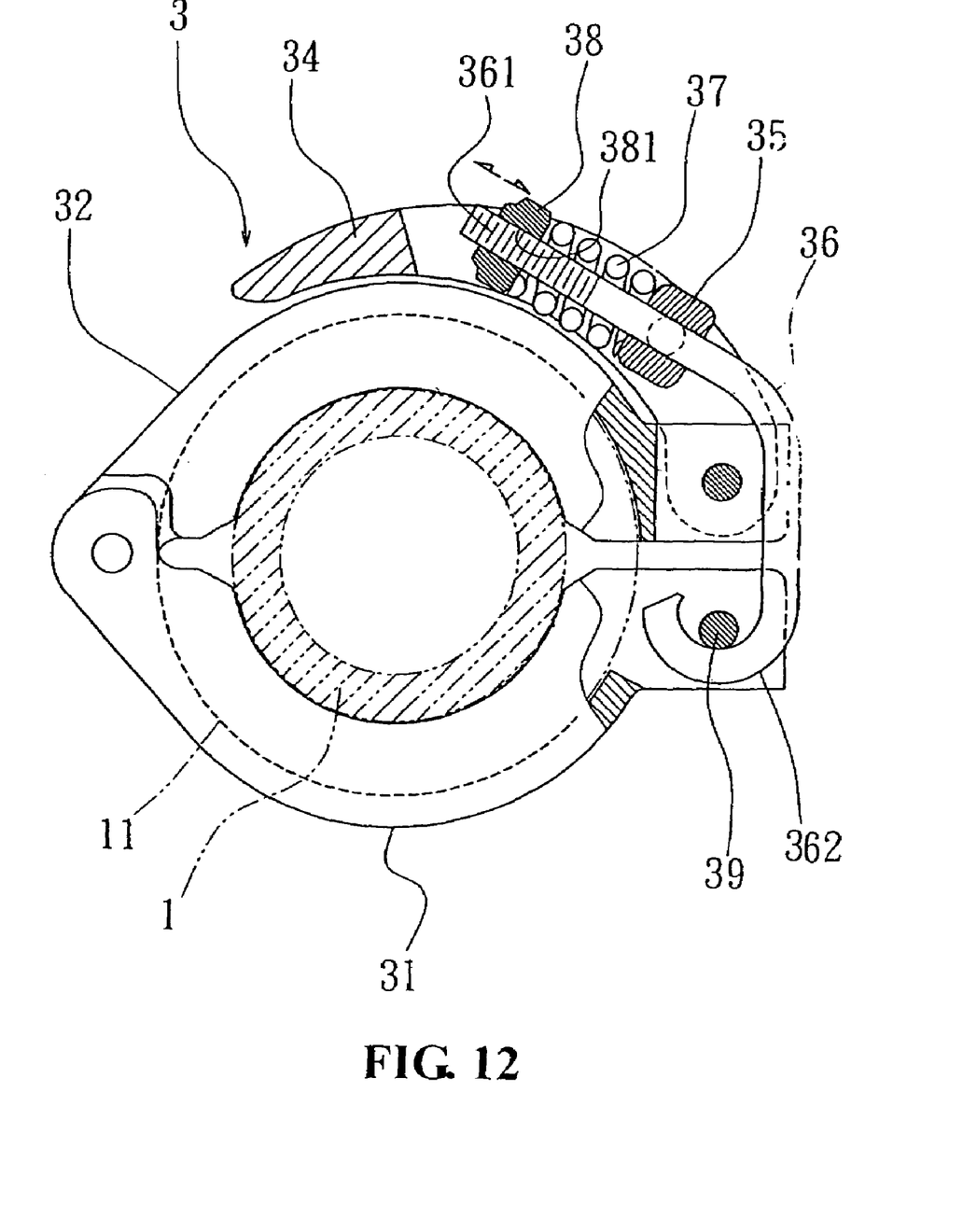
FIG. 12 is an end view of the pipe clip in a secured condition, showing adjustment of securing force of the clip.

Also referring to FIGS. 11 and 12, to install the pipe clip 3, with the hooked end 362 of the hook-on member 36 disengaging from the bar 39 and the upper clip member 32 being open with respect to the lower clip member 31, the upper and lower flange-receiving grooves 311, 321 of the upper and lower clip members 31, 32 are fit over butted flanges 11 of two pipe sections 1 (see FIG. 9). And then the upper clip member 32 is closed with respect to 15 the lower clip member 31. The hooked end 362 of the hook-on member 36 is then positioned to hook on the bar 39 and then the pull tab 34 is forced toward the secured position by acting against the biasing force of the resilient element 37.

The stem portion of the hook-on member 36 is angle-shaped in such a way that when the pull tab 34 is located at the secured position, the biasing force of the resilient element 36 induces a torque against rotation of the pull tab 34 in a direction from the secured position to the released position. This secures the pull tab 34 in the secured position.

When the resilient element 37 undergoes elastic fatigue, the undesired fatigue can be compensated by adjustment of the retention member 38 to change the deformation of the resilient element 37, as illustrated by the double-headed arrow in FIG. 12.

Apparently, the pipe clip of the present invention can be easily and efficiently installed by pulling/pushing the pull tab 4 with respect to the clip. In addition, fatigue of parts of the clip can be readily compensated by proper adjustment without replacement of the parts.

Although the present invention has been described with reference to the preferred embodiment thereof, it is apparent to those skilled in the art that a variety of modifications and changes may be made without departing from the scope of the present invention which is intended to be defined by the appended claims.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A pipe clip comprising upper and lower clip members which are pivoted at one end to rotate with respect to each other for opening/closing the clip, the upper and lower clip members having inside surfaces defining upper and lower flange-receiving grooves adapted to receive and engage flanges of pipe sections, the upper and lower clip members forming, at an opposite end, upper and lower slots, a locking bar being fixed in the lower slot, characterized by comprising a U-shaped pull tab comprising two limbs having free ends fit over and pivoted to side walls of the upper slot, an abutting block fixed while rotating between the limbs of the pull tab and defining a through-hole through which a stem of a hook-on member extends, the hook-on member having a hooked end engaged with the locking bar, the stem having an end section extending beyond the abutting block and supporting a resilient element that is retained in position by a retention member and induces a biasing force on the pull tab, the retention member being movable with respect to the hook-on member to perform adjustment of the biasing force, wherein the end section of the stem of the hook-on member forms threading and the retention member forms an inner-threaded hole engaged with the threading of the hook-on member.

* * * * *